US010584274B2

(12) United States Patent
Bataweel et al.

(10) Patent No.: US 10,584,274 B2
(45) Date of Patent: Mar. 10, 2020

(54) IN-SITU GENERATION OF GLASS-LIKE MATERIALS INSIDE SUBTERRANEAN FORMATION

(71) Applicant: Saudi Arabian Oil Company, Dhahran (SA)

(72) Inventors: Mohammed Bataweel, Dhahran (SA); Prasad Baburao Karadkar, Dhahran (SA); Ayman Al-Mohsin, Dhahran (SA); Haitham A. Othman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/626,761

(22) Filed: Jun. 19, 2017

(65) Prior Publication Data

US 2018/0362827 A1     Dec. 20, 2018

(51) Int. Cl.
| | | |
|---|---|---|
| *E21B 33/138* | (2006.01) | |
| *C09K 8/46* | (2006.01) | |
| *C09K 8/42* | (2006.01) | |
| *C03C 3/06* | (2006.01) | |
| *E21B 36/00* | (2006.01) | |
| *E21B 36/04* | (2006.01) | |
| *C04B 28/24* | (2006.01) | |

(52) U.S. Cl.
CPC ............... *C09K 8/46* (2013.01); *C03C 3/06* (2013.01); *C04B 28/24* (2013.01); *C09K 8/426* (2013.01); *E21B 33/138* (2013.01); *E21B 36/00* (2013.01); *E21B 36/008* (2013.01); *E21B 36/04* (2013.01); *C03C 2201/02* (2013.01); *C03C 2203/22* (2013.01); *C03C 2203/30* (2013.01); *C09K 2208/10* (2013.01)

(58) Field of Classification Search
None
See application file for complete search history.

(56) References Cited

U.S. PATENT DOCUMENTS

| | | |
|---|---|---|
| 1,748,315 A | 2/1930 | Stoewener |
| 3,087,902 A | 4/1963 | Dharma |
| (Continued) | | |

FOREIGN PATENT DOCUMENTS

| | | |
|---|---|---|
| EP | 0260888 A2 | 3/1988 |
| WO | 2009034287 A1 | 3/2009 |
| WO | 2017079386 A1 | 5/2017 |

OTHER PUBLICATIONS

Krumrine, P.H. Lefenfeld, M. and Romney G.A. 2015. Alkali Metal Silicides: A New Material for Heavy-Oil Production Processes, SPE Journal. SPE 169490.

(Continued)

*Primary Examiner* — Andrew Sue-Ako
(74) *Attorney, Agent, or Firm* — Bracewell LLP; Constance G. Rhebergen; Linda L. Morgan

(57) ABSTRACT

Systems and methods for forming a permanent plug in a subterranean formation include providing a solution of colloidal silica and pumping the colloidal silica into a bore of a subterranean well so that the colloidal silica penetrates pores of the subterranean formation. The colloidal silica within the pores of the subterranean formation is dehydrated to form a glass-like material within the pores of the subterranean formation.

11 Claims, 2 Drawing Sheets

(56) References Cited

U.S. PATENT DOCUMENTS

| | | | |
|---|---|---|---|
| 3,650,327 A * | 3/1972 | Burnside | E21B 33/10 166/292 |
| 3,861,469 A | 1/1975 | Bayless et al. | |
| 3,910,351 A * | 10/1975 | Wu | C09K 8/56 166/276 |
| 4,819,723 A | 4/1989 | Whitfill et al. | |
| 4,901,797 A | 2/1990 | Summers et al. | |
| 5,351,757 A | 10/1994 | Chou et al. | |
| 7,163,358 B2 | 1/2007 | Greenwood et al. | |
| 7,740,068 B2 | 6/2010 | Ballard | |
| 7,954,549 B2 | 6/2011 | Lende et al. | |
| 8,215,393 B2 | 7/2012 | Mackay et al. | |
| 2013/0292120 A1 | 11/2013 | Patil et al. | |
| 2013/0341023 A1* | 12/2013 | Krumrine, III | E21B 43/267 166/280.1 |
| 2014/0174724 A1 | 6/2014 | Livanec et al. | |
| 2014/0174739 A1* | 6/2014 | Bourcier | C09K 8/5045 166/292 |
| 2015/0107833 A1 | 4/2015 | Boone et al. | |
| 2015/0299625 A1 | 10/2015 | Lefenfeld et al. | |

OTHER PUBLICATIONS

The International Search Report and Written Opinion for related PCT application PCT/US2018/038212 dated Sep. 21, 2018.

* cited by examiner

IN-SITU GENERATION OF GLASS-LIKE MATERIALS INSIDE SUBTERRANEAN FORMATION

BACKGROUND

1. Field of the Disclosure

The present disclosure relates in general to plugging subterranean formations, and more particularly to the in-situ formation of glass-like materials within a subterranean formation for permanent plugging.

2. Description of the Related Art

There may be times during the life of a subterranean well when an operator desires to improve the production performance of the subterranean well by plugging a portion or all of certain subterranean formations associated with such subterranean well. For example, an operator may wish to plug all or a portion of a particular subterranean formation to improve sweep treatments, shut-off water and gas production, shut-off gas in oil wells, abandon a particular zone, shut-off natural or propped fractures or otherwise alter the permeability of the subterranean formation.

Some current methods of plugging subterranean formations include injecting substances into the pores of the subterranean formation to block the flow of fluids through such pores. However, the injected substances of some currently available systems degrade with time and temperature and have insufficient mechanical strength to operate as a reliable permanent plug.

SUMMARY OF THE DISCLOSURE

Embodiments of this disclosure provide systems and methods for plugging a subterranean formation permanently by the in-situ generation of glass-like materials inside the pores of the subterranean formation. A colloidal silica solution is pumped into the subterranean formation and allowed to gel up. The colloidal silica gel is then dehydrated by the application of heat to form a glass-like material. The glass-like material forms inside the pores of the subterranean formation to create a permanent seal.

In an embodiment of this disclosure, a method for forming a permanent plug in a subterranean formation includes providing a solution of colloidal silica and pumping the colloidal silica into a bore of a subterranean well so that the colloidal silica penetrates pores of the subterranean formation. The colloidal silica within the pores of the subterranean formation is dehydrated to form a glass-like material within the pores of the subterranean formation.

In alternate embodiments, before pumping the colloidal silica into the bore of the subterranean well, an activator can be mixed with the colloidal silica so that the colloidal silica forms a gel within the pores of the subterranean formation. After pumping the colloidal silica into the bore of the subterranean well, the colloidal silica can be heated so that the colloidal silica forms a gel within the pores of the subterranean formation.

In other alternate embodiments, dehydrating the colloidal silica can include producing gas from the subterranean well. Alternately, dehydrating the colloidal silica can include pumping a reactant into the bore of the subterranean well so that the reactant triggers an exothermic chemical reaction. Alternately, dehydrating the colloidal silica can include pumping sodium nitrite and ammonium chloride into the bore of the subterranean well so that the sodium nitrite reacts with the ammonium chloride to generate heat. Alternately, dehydrating the colloidal silica can include pumping sodium silicide into the bore of the subterranean well so that the sodium silicide reacts with water molecules to generate heat. Dehydrating the colloidal silica can alternately include lowering a laser system into the bore of the subterranean well and operating the laser system to generate heat. Dehydrating the colloidal silica can include lowering a microwave system into the bore of the subterranean well and operating the microwave system to generate heat. A microwave enabler can be lowered within the subterranean well and heating the microwave enabler with the microwave system.

In an alternate embodiment of this disclosure, a method for forming a permanent plug in a subterranean formation includes providing a solution of colloidal silica, the solution of colloidal silica including a stabilized mixture of silica particles suspended in a liquid. The colloidal silica is pumped into a bore of a subterranean well so that the colloidal silica penetrates pores of the subterranean formation. The gelling-up of the solution of colloidal silica is provided for to provide a gel of colloidal silica within the pores of the subterranean formation. The gel of colloidal silica is dehydrated to form a dehydrated colloidal silica within the pores of the subterranean formation, the dehydrated colloidal silica being a glass-like material.

In alternate embodiments, the silica particles can range in size from 1 to 20 nm. The dehydrated colloidal silica can permanently plug the pores of the subterranean formation. Providing the gelling-up of the solution of colloidal silica can include mixing the solution of colloidal silica with an activator In another alternate embodiment of this disclosure, a system for forming a permanent plug in a subterranean formation includes a solution of colloidal silica and a distribution system operable to pump the solution of colloidal silica into a bore of a subterranean well so that the colloidal silica penetrates pores of the subterranean formation. A dehydration system is operable to dehydrate the colloidal silica within the pores of the subterranean formation to form a glass-like material within the pores of the subterranean formation.

In alternate embodiments, the dehydration system can include a reactant pumped into the bore of the subterranean well, the reacted selected to trigger an exothermic chemical reaction. The reactant can be sodium nitrite and ammonium chloride that are operable to react with each other to generate heat. The reactant can be sodium silicide that is operable to react with water molecules to generate heat. The dehydration system can include a laser system operable to lower into the bore of the subterranean well to generate heat. The dehydration system can include a microwave system operable to lower into the bore of the subterranean well to generate heat. A microwave enabler can be operable to be located within the subterranean well and heated with the microwave system.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The Specification, which includes the Summary of Disclosure, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the meaning commonly understood by one of ordinary skill in the art to which this disclosure relates unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
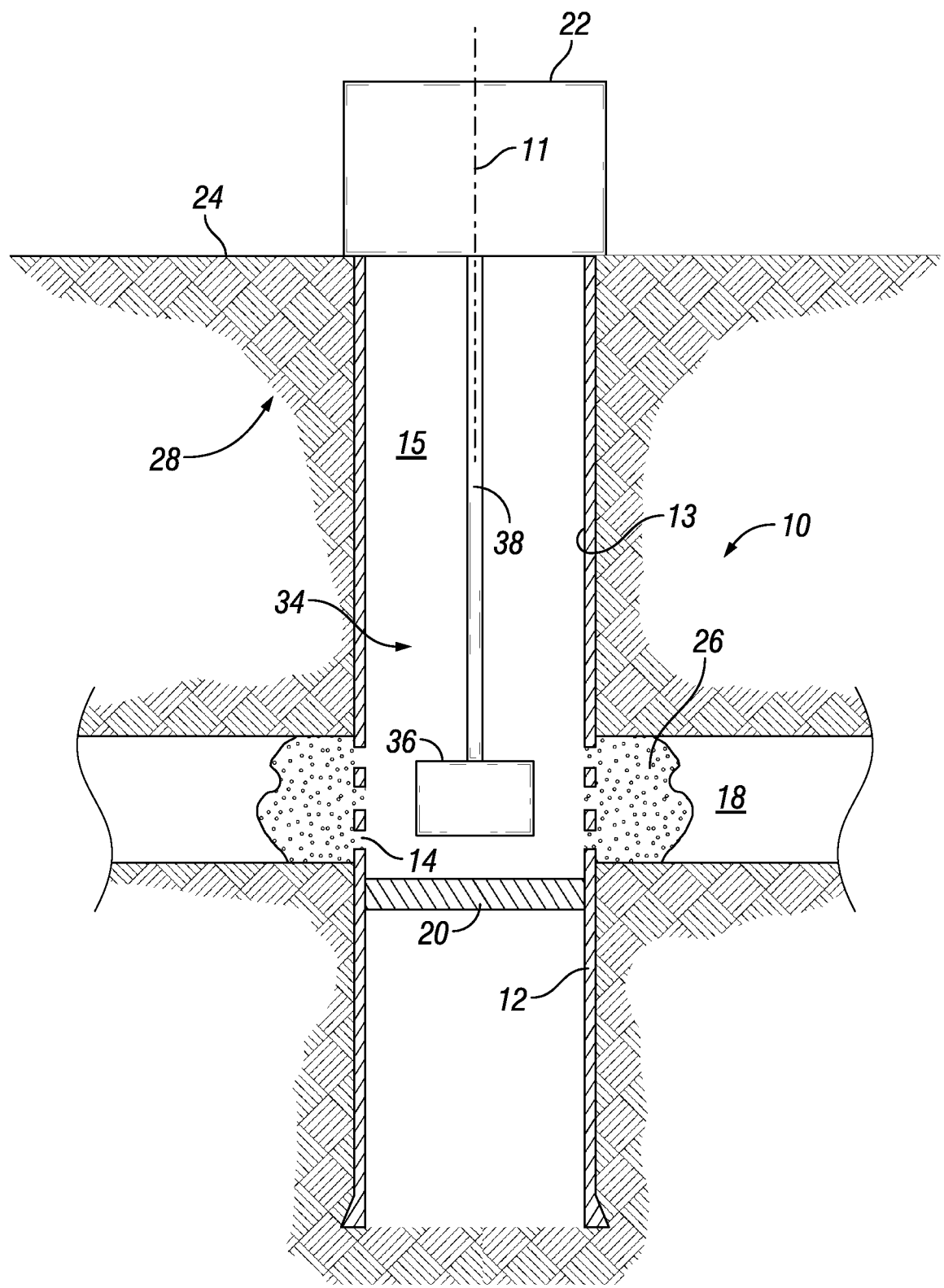
FIG. 1 is a schematic section view of a subterranean well with a system for forming a permanent plug in a subterranean formation, in accordance with an embodiment of this disclosure.
Figure 2:
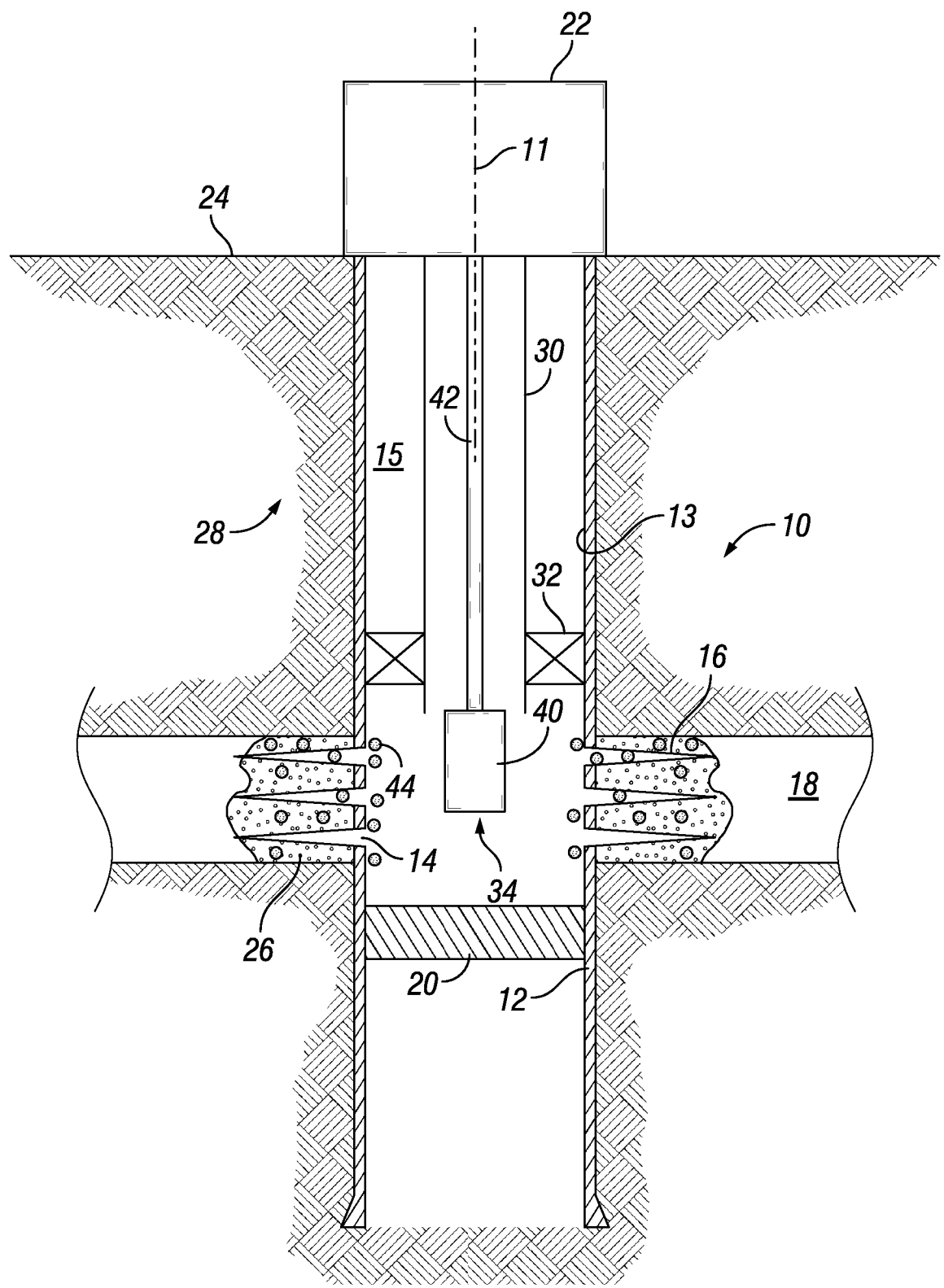
FIG. 2 is a schematic section view of a subterranean well with a system for forming a permanent plug in a subterranean formation, in accordance with an alternate embodiment of this disclosure.

Looking at FIGS. 1-2, subterranean well 10 can be a subterranean well used in hydrocarbon production operations. Subterranean well 10 can be lined with cement and casing 12 in a manner known in the art. Subterranean well 10 can have a central axis 11. Subterranean well 10 can be a vertical cased well, as shown, or can be open hole or can be angled or slanted, horizontal, or can be a multilateral well. Subterranean well 10 can have an inner diameter surface 13. Inner diameter surface 13 of subterranean well 10 can be the inner diameter surface of casing 12. Subterranean well 10 can have a bore 15 that can be an inner bore of casing 12. Perforations 14 can extend through the sidewall of casing 12. In the embodiment of FIG. 14, perforations 14 can be in fluid communication with fractures 16 that extend into subterranean formation 18. Packer 20 can seal against inner diameter surface 13 of casing 12 to prevent fluid flow past packer 20 within casing 12.

FIGS. 1-2 show only a set of perforations 14 into subterranean formation 18. In alternate embodiments there may be additional subterranean formations 18 and casing 12 can include additional sets of perforations 14 through casing 12 into such additional subterranean formations 18. A wellhead assembly 22 can be located at surface 24, such as an earth's surface, at an upper end of subterranean well 10.

Subterranean formation 18 can contain a fluid such as a liquid or gaseous hydrocarbon, water, steam, or a combination thereof. The fluid within subterranean formation 18 can pass through perforations 14 and into subterranean well 10.

During the life of subterranean well 10, it may be desirable to permanently reduce or completely plug the flow of fluids from subterranean formation 18 into subterranean well 10. As an example, an operator may wish to plug all or a portion of subterranean formation 18 to improve sweep treatments, shut-off water or gas production, abandon subterranean formation 18, shut-off fractures 16 or otherwise alter the permeability of subterranean formation 18.

In order to form a permanent plug in subterranean formation 18, a plugging material 26 can be used to fill pores of subterranean formation 18. In embodiments of this disclosure, a solution of colloidal silica can provided. The solution of colloidal silica can include silica particles that have a nano or micron size. For example, the silica particles can range in size from 1 nanometer (nm) to 0.1 microns (μm). In certain embodiments, the silica particles can range in size from 1 to 20 nm. The colloidal silica particles of the solution of colloidal silica can be in a range of 5% to 70% wt % by weight of the solution of colloidal silica.

The colloidal silica particles of the solution of colloidal silica can be suspended in an aqueous solution. Although the colloidal silica particles of the solution of colloidal silica can alternately be suspended in a solvent, such as an alcohol, an aqueous solution is less costly and safer than using a solvent. The solution of colloidal silica can be stabilized to allow the colloidal silica particles to remain suspended in the solution. As an example, the pH, concentration, and size of the colloidal silica particles can be adjusted to arrive at a stable solution of colloidal silica. In examples of this disclosure, the solution of colloidal silica can be a pure silica sols that are stabilized to arrive at a pH of about 9 to about 11.

The solution of colloidal silica consists of dense, amorphous particles of $SiO_2$ that can be formed of building blocks that include randomly-distributed $[SiO_4]$-tetrahedra. The viscosity of the solution of colloidal silica can be close to that of water, which will allow the solution of colloidal silica to penetrate deeper inside subterranean formation 18 than a more viscous alternate product. In embodiments of this disclosure, the solution of colloidal silica is free of additional components. Without additional components, the solution of colloidal silica has low viscosity so that it can be pumped deeper inside the formation.

As an example the solution of colloidal silica can be free of silicates, alcohols, hydrocarbons, monomers, and polymers and is not mixed with concretes or other materials that would interfere with the performance of the colloidal silica. Without additives that could alter any reaction time, the gelation time can be optimized precisely while designing the treatment solution. Including additional constituents in the colloidal silica can compromise the mechanical properties of the colloidal silica in its function as a permanent plug at high temperatures and pressures. As an example, polymers undergo thermal degradation, at high temperatures, the components of the long chain backbone of the polymer can separate and change the properties of polymer. Therefore a plug made by polymerization or with a polymer can thermally degrade with time and may not result in a reliable permanent plug. The dehydration of colloidal silica to make in-situ glass-like material as described in this disclosure is more thermally stable over time than polymers and can provide a permanent plug.

Distribution system 28 can be used to deliver the solution of colloidal silica into bore 15 of subterranean well 10 so that the colloidal silica penetrates pores of subterranean formation 18. In the example schematic of FIG. 1, distribution system 28 includes casing 12 through which the solution of colloidal silica is delivered to subterranean formation 18. Packer 20 limits the downward travel of the colloidal silica within casing 12. The solution of colloidal silica can be pumped through bore 15 and pass through perforations 14 of casing 12 to penetrate pores of subterranean formation 18. In alternate embodiments, there may not be a packer 20.

In the example schematic of FIG. 2, distribution system 28 includes tubing 30 that extends within casing 12. The solution of colloidal silica is delivered to subterranean formation 18 through tubing 30. Tubing packer 32 can circumscribe tubing 30 and prevent fluids from passing tubing packer 32 through the annular space between the outer diameter of tubing 30 and the inner diameter surface 13 of subterranean well 10. Packer 20 limits the downward travel of the colloidal silica within casing 12. The solution of colloidal silica can be pumped through tubing 30 into bore 15 and pass through perforations 14 of casing 12 to penetrate pores of subterranean formation 18. In alternate embodiments, tubing packer 32 and packer 20 are not included.

The colloidal silica can form a gel within the pores of subterranean formation 18. The gelling-up of the solution of colloidal silica to provide a gel of colloidal silica within the pores of subterranean formation 18 can be provided by alternate methods. In certain embodiments, before pumping the colloidal silica into subterranean well 10, an activator can be mixed with the colloidal silica. As an example, the colloidal silica can be mixed with sodium chloride (NaCl), potassium chloride (KCl), or other known activator that would provide for the conversion of the colloidal silica to a gel with an increased viscosity that will seal permeable zones of subterranean formation 18. The activated colloidal silica can gel-up with time during shut-in and with exposure to the bottom hole temperature without an external heating system. Alternately, exposure to heat down hole over time during shut-in can cause the colloidal silica to form a gel within the pores of subterranean formation 18 without the need for an activator. In other alternate embodiments, a clay control agent can be added to improve the injectivity of the colloidal silica in certain formations, such as sandstone formations.

Looking at FIGS. 1-2, dehydration system 34 is used to dehydrate the colloidal silica that is in the pores of subterranean formation 18 to form a glass-like material within the pores of subterranean formation 18. The dehydrated colloidal silica permanently plugs the pores of subterranean formation 18. In example embodiments, subterranean formation 18 and the colloidal silica within subterranean formation 18 is heated in-situ to convert the colloidal silica to glass-like material to form plugging material 26.

In alternate example embodiments, the dehydration system includes pumping a reactant into bore 15 of subterranean well 10 so that the reactant triggers an exothermic chemical reaction. The reactant can be selected to trigger an exothermic chemical reaction with sufficient heat over a period of time to cause the colloidal silica to dehydrate. As an example, sodium silicide can be pumped into bore 15 of subterranean well 10 so that the sodium silicide react with water molecules to generate heat. The reaction of sodium silicide with water is can be shown as follows:

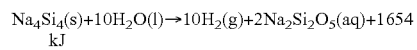

$$Na_4Si_4(s)+10H_2O(l) \rightarrow 10H_2(g)+2Na_2Si_2O_5(aq)+1654 \text{ kJ}$$

Over time, the heat generated by the exothermic reaction will penetrate into subterranean formation 18 and can dehydrate the colloidal silica to convert the colloidal silica to glass-like material. As an alternate example, the reactants can be sodium nitrite and ammonium chloride. When pumped into bore 15 of subterranean 10, the sodium nitrite can react with the ammonium chloride to generate heat.

In the alternate example embodiment of FIG. 1, dehydration system 34 includes laser system 36. Laser system 36 can be lowered into bore 15 of subterranean well 10 and operated to generate heat that will penetrate into subterranean formation 18 for dehydrating the colloidal silica to convert the colloidal silica to glass-like material. Laser system 36 can be lowered into bore 15 with laser support member 38, which may be coiled tubing, rods, a wireline, fiber optic cable or other known means for supporting a tool in a subterranean well. The laser power, orientation, and beam shape can be precisely controlled.

In the alternate example embodiment of FIG. 2, dehydration system 34 includes microwave system 40. Microwave system 40 can be lowered into bore 15 of subterranean well 10 through tubing 30. Microwave system 40 can be operated to generate heat that will penetrate into subterranean formation 18 for dehydrating the colloidal silica to convert the colloidal silica to glass-like material. Microwave system 40 can include one or more microwave antennas to be lowered in subterranean well 10 near the targeted area. Microwave system 40 will heat the liquid component of the colloidal silica mixture and will evaporate the liquid, resulting in dehydration. Microwave system 40 can be lowered into bore 15 with microwave support member 42, which may be coiled tubing, rods, a wireline, or other known means for supporting a tool in a subterranean well. Microwave system 40 can provide in-situ heat generation. The power and orientation of microwave system 40 can be easily controlled.

In certain embodiments using microwave system 40, a microwave enabler can be located within subterranean well 10 and heated with microwave system 40. A microwave enabler heats up to high temperatures when exposed to microwaves and can be applied in different configurations. As an example, a microwave enabler can be ceramic proppant 44 that is pumped into bore 15 before, with, or after the colloidal silica. Then the microwave enabler will be heated using microwave system 40. Alternately, the microwave enabler can be a ceramic or other known material that heats to high temperatures when exposed to microwaves and can have a form other than proppant, such as a packing, a plate, or a mesh. Such microwave enabler can be lowered into bore 15 by a known means and located proximate to the target region containing the colloidal silica to be converted to a glass-like material. Combining microwave with a microwave enabler will increase the generated heat and hence dehydrate colloidal silica more efficiently to form glass like material.

In a laboratory experiment, a 7.5 wt % colloidal silica and 0.5 wt % NaCl mixture, each by weight percent of the solution of colloidal silica, was prepared at room temperature, then the mixture was kept in an oven at 200° F. for three hours. The colloidal silica mixture completely gelled up over the 3 hour period to form a soft rubbery gel. Although the temperature of the oven for the laboratory experiment was at 200° F., the colloidal silica can be gelled up at a range of reservoir temperatures of a subterranean development. The temperature of the oven was then raised to 250° F. to dehydrate water molecules present in gelled colloidal silica. The colloidal silica gel formed a hard solid glass-like material over a 10 hour period. Although the temperature of the oven was 250° F. to dehydrate the colloidal silica, a lower temperature can be used to dehydrate the colloidal silica, for example, by exchanging water for gas.

Embodiments of this disclosure therefore disclose systems and methods for providing deep and permanent water shut-off with improved mechanical properties compared to currently available systems and methods.

Embodiments described herein, therefore, are well adapted to carry out the objects and attain the ends and advantages mentioned, as well as others inherent therein. While certain embodiments have been described for purposes of disclosure, numerous changes exist in the details of procedures for accomplishing the desired results. These and other similar modifications will readily suggest themselves to those skilled in the art, and are intended to be encompassed within the scope of the present disclosure disclosed herein and the scope of the appended claims.

What is claimed is:

1. A method for forming a permanent plug in a subterranean formation, the method including:
    providing a solution of colloidal silica;
    pumping the colloidal silica into a bore of a subterranean well so that the colloidal silica penetrates pores of the subterranean formation;
    forming a gel with the colloidal silica within the pores of the subterranean formation by heating the colloidal silica at a gel formation temperature over a gel formation period; and
    after the gel formation period, heating the gel to a dehydration temperature within pores of the subterranean formation over a ten hour period to form a glass-like material of dehydrated colloidal silica within the pores of the subterranean formation, by pumping a reactant into the bore of the subterranean well so that the reactant triggers an exothermic chemical reaction, where the dehydration temperature is greater than the gel formation temperature.

2. The method of claim 1, where forming the gel with the colloidal silica within the pores of the subterranean formation includes before pumping the colloidal silica into the bore of the subterranean well, mixing an activator with the colloidal silica so that the colloidal silica forms the gel within the pores of the subterranean formation.

3. The method of claim 1, wherein heating the gel includes pumping sodium silicide into the bore of the subterranean well so that the sodium silicide react with water molecules to generate heat.

4. The method of claim 1, wherein heating the gel includes pumping sodium nitrite and ammonium chloride into the bore of the subterranean well so that the sodium nitrite reacts with the ammonium chloride to generate heat.

5. A method for forming a permanent plug in a subterranean formation, the method including:
    providing a solution of colloidal silica, the solution of colloidal silica including a stabilized mixture of silica particles suspended in a liquid;
    pumping the colloidal silica into a bore of a subterranean well so that the colloidal silica penetrates pores of the subterranean formation;
    providing for gelling-up of the solution of colloidal silica to provide a gel of colloidal silica within pores of the subterranean formation by heating the colloidal silica at a gel formation temperature over a gel formation period to form a gel; and
    after the gel formation period, heating the gel to a dehydration temperature within the pores of the subterranean formation over a ten hour period, to form a glass-like material of dehydrated colloidal silica within the pores of the subterranean formation by pumping a reactant into the bore of the subterranean well so that the reactant triggers an exothermic chemical reaction, where the dehydration temperature is greater than the gel formation temperature.

6. The method of claim 5, wherein the silica particles range in size from 1 to 20 nm.

7. The method of claim 5, wherein the dehydrated colloidal silica permanently plugs the pores of the subterranean formation.

8. The method of claim 5, wherein providing the gelling-up of the solution of colloidal silica includes mixing the solution of colloidal silica with an activator.

9. A system for forming a permanent plug in a subterranean formation, the system including:
    a solution of colloidal silica;
    a distribution system operable to pump the solution of colloidal silica into a bore of a subterranean well so that the colloidal silica penetrates pores of the subterranean formation;
    a gelation system operable to form a gel with the colloidal silica within the pores of the subterranean formation at a gel formation temperature over a gel formation period; and
    a dehydration system operable to heat the gel to a dehydration temperature within the pores of the subterranean formation over a ten hour period after the gel formation period at a dehydration temperature to form a glass-like material of dehydrated colloidal silica within the pores of the subterranean formation, wherein the dehydration system includes a reactant pumped into the bore of the subterranean well, the reactant selected to trigger an exothermic chemical reaction, and where the dehydration temperature is greater than the gel formation temperature.

10. The system of claim 9, wherein the reactant is sodium silicide operable to react with water molecules to generate heat.

11. The system of claim 9, wherein the reactant is sodium nitrite and ammonium chloride, the sodium nitrate being operable to react with the ammonium chloride to generate heat.

* * * * *